United States Patent [19]

Logue et al.

[11] Patent Number: 4,528,876

[45] Date of Patent: Jul. 16, 1985

[54] UNIVERSAL SINGLE SPINDLE PIN CRANKSHAFT LATHE

[75] Inventors: John E. Logue, Jackson; Samuel M. Worthington, Grass Lake, both of Mich.

[73] Assignee: Crankshaft Machine Company, Jackson, Mich.

[21] Appl. No.: 493,434

[22] Filed: May 11, 1983

[51] Int. Cl.³ .............................................. B23B 5/18
[52] U.S. Cl. ........................................... 82/9; 82/19; 51/237 CS
[58] Field of Search .................... 82/9, 19; 51/237 CS

[56] References Cited

U.S. PATENT DOCUMENTS

| | | | |
|---|---|---|---|
| 2,942,526 | 6/1960 | Maecker | 82/9 |
| 3,757,615 | 9/1973 | Oeming et al. | 82/9 |
| 3,808,653 | 5/1974 | Oeming et al. | 82/9 |
| 4,297,926 | 11/1981 | Russ et al. | 82/9 |
| 4,375,670 | 3/1983 | Kralowetz | 82/9 |

Primary Examiner—Leonidas Vlachos
Attorney, Agent, or Firm—Beaman & Beaman

[57] ABSTRACT

A crankshaft lathe of the single spindle pin type capable of universal use with a variety of types of crankshafts. The lathe includes a single tool support mounted upon ways for movement both perpendicular and parallel to the workpiece axis. A single drive motor powers both workpiece rotation and tool movement through an indexable connection wherein the relative angular relationship between workpiece and tool drive is adjustable. Automatic controls permit the lathe to individually machine the pins sequentially of a multiple pin crankshaft.

10 Claims, 8 Drawing Figures

FIG_3_

FIG_4_

UNIVERSAL SINGLE SPINDLE PIN CRANKSHAFT LATHE

BACKGROUND OF THE INVENTION

Crankshafts typically employed in internal combustion engines utilize crankpin bearing surfaces, hereafter often called pins, offset with respect to the crankshaft axis and angularly disposed about the crank axis. In the manufacture of multiple pin crankshafts utilizing a plurality of crank pin bearing surfaces the pins are usually machined, as by turning, simultaneously. In conventional practice, a plurality of pin turning tools are connected to a pair of master cranks which rotate in synchronization with the workpiece wherein the tools move through an orbital motion equal to the motion of the workpiece pins. The tools are simultaneously brought into engagement with the workpiece pins and all of the pins are simultaneously machined. Such an operation requires a plurality of tool supports mounted upon the master cranks and the tool supports are mounted upon a carriage movable between tool engaging and retracted positions. Examples of such crankshaft machines are found in the assignee's U.S. Pat. Nos. 3,757,615 and 3,808,653.

Typical crankshaft lathes capable of machining all of the pins of a crankshaft simultaneously regardless of whether the crankshaft contains four, six or eight pins, are very expensive to manufacture, require expensive tooling, and each complete lathe is basically designed to machine a particular crankshaft, and major expenses and conversion procedures are required to tool a lathe to handle a different workpiece.

It is an object of the invention to provide a universal single spindle crankshaft lathe wherein a lathe is able to readily accommodate a variety of types of crankshaft workpieces. Thus, with a single lathe, crankshafts having two, four, six or eight pins may be readily accommodated with a minimum of tooling expense, and crankshaft prototype machining and short production runs can be economically processed at minimum costs.

A further object of the invention is to provide a universal crankshaft pin lathe wherein a single crankshaft pin is machined at a time and the machine automatically sequentially machines the workpiece pins in an accurate manner without operator attention.

An additional object of the invention is to provide a universal single spindle crankshaft lathe wherein the lathe employs a single drive motor to rotate both the workpiece and the tooling, and the relative rotational orientation between the crankshaft workpiece and tooling may be readily adjusted by automatic controls to accommodate the various crankshaft pins.

Yet another object of the invention is to provide a universal single spindle crankshaft lathe wherein the tools are mounted upon a compound carriage and slide permitting the tooling to be adjusted in a plane perpendicular to the crankshaft workpiece axis, and orbit in such a plane during machining, and also permit the tooling to be translated parallel to the workpiece axis for alignment with different workpiece pin bearings.

In the practice of the invention the lathe includes a base upon which headstock and tailstock spindles are mounted having chucks in which the workpiece crankshaft is mounted. A drive motor rotates both spindles through a first drive train. A carriage is mounted upon the base movable by an expansible chamber motor toward and away from the workpiece axis at right angles thereto. A slide mounted upon the carriage is adjustable in a direction parallel to the workpiece axis by an electric motor operating an anti-friction lead screw.

A tool case is mounted on the slide and supports a tool arm which includes cranks rotatably mounted thereon which are driven through a splined drive shaft whereby rotation of the drive shaft causes the tool arm, upon which the cutting tools are mounted, to orbit in a plane perpendicular to the workpiece axis. Thus, the movement of the tool arm permits the tools to follow the movement of the workpiece crankshaft pins during rotation and machine the pins to the accuracy desired.

The tool case is mounted upon the slide for movement parallel to the workpiece axis. Thus, the tool arm and tools are readily moved into a machining relationship to the workpiece pins, or retracted therefrom, and may also be shifted in an axial direction to be sequentially aligned with the pin that is to be machined.

The indexable connection between the drive for the headstocks and the drive shafts for the tool arm is shifted between drive and indexable positions by an expansible chamber motor. The tool arm drive shaft is adjusted between selective indexable positions by an index motor of the hydraulic type, and electric rotary switches sense the position of the tool arm drive to permit orientation of the tools to accommodate the particular pin to be machined. Preferably, orientation means are also associated with the head and tailstock spindle drive train such that the spindle drive will be oriented in a predetermined manner during adjustment of the indexable connection.

While the indexable connection may take a number of forms, in the preferred embodiment the connection consists of a female member having twelve recesses disposed about a shaft axis, and the male member includes three detents arranged at 120° about a shaft axis selectively interfitting with the recesses whereby a positive drive between the headstock and tailstock spindles and tool arm drive shaft is maintained, and yet the relative rotational relationship therebetween may be readily adjusted to permit the machining of different workpiece pins.

BRIEF DESCRIPTION OF THE DRAWINGS

The aforementioned objects and advantages of the invention will be apparent from the following description and accompanying drawings wherein.

DESCRIPTION OF THE PREFERRED EMBODIMENT

Figure 1:
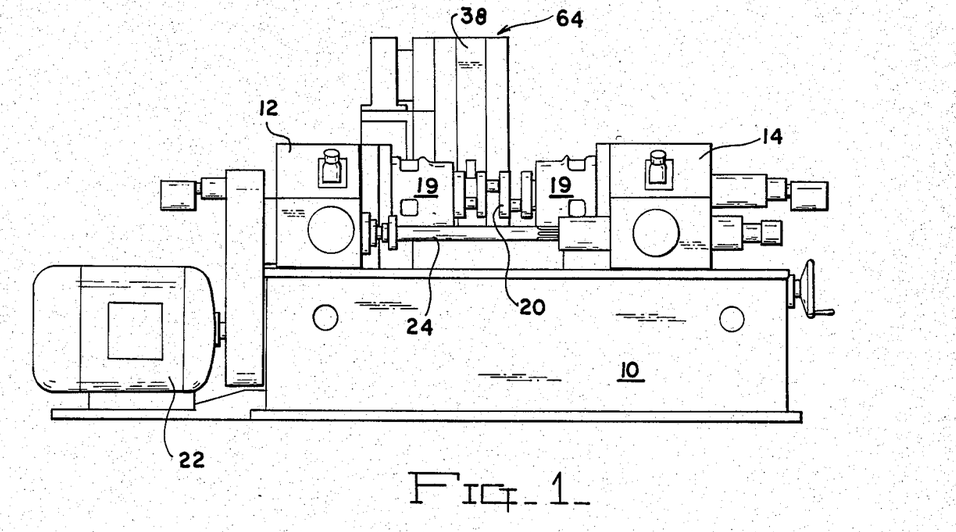
FIG. 1 is a front elevational view of a universal single spindle crankshaft machine in accord with the invention.
Figure 2:
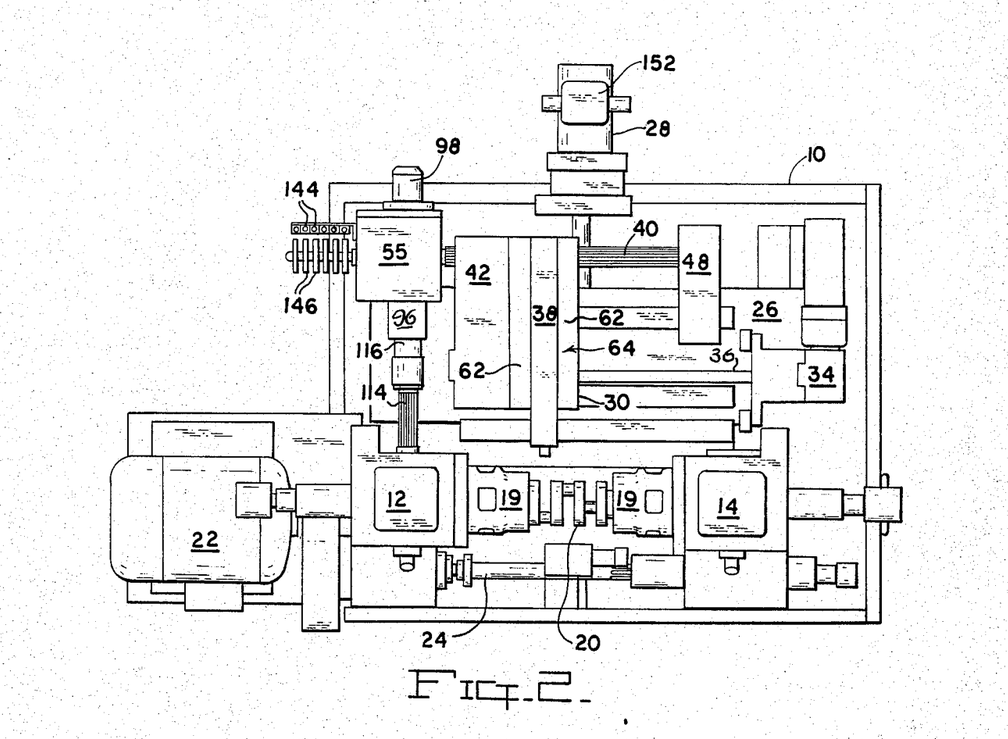
FIG. 2 is a top plan view of the crankshaft lathe.
Figure 3:
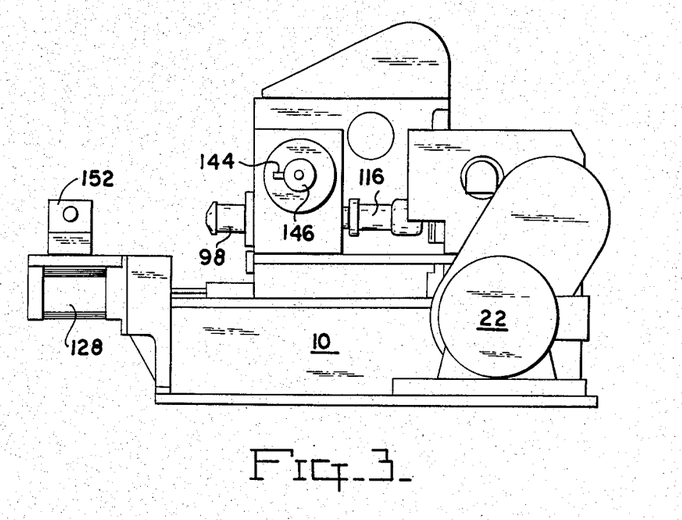
FIG. 3 is an end elevational view as taken from the left of FIG. 1.

The basic relationship of the components of a universal single spindle crankshaft lathe in accord with the invention will be appreciated from FIGS. 1 and 2. The lathe includes a heavy rectangular frame or base 10 upon which a headstock 12 and a coaxial tailstock 14 are mounted. The headstock includes a rotatable spindle 16, and the tailstock includes a rotatable spindle upon which conventional chucks or work holders 19 are mounted for gripping the workpiece crankshaft 20 for rotation about the spindle axis. The head and tailstock spindles are rotated by a primary electric drive motor 22 mounted adjacent the base which, through gearing as will be apparent from FIG. 5, drives both the head and tailstock spindles, the tailstock spindle being driven through driveshaft 24 and appropriate gearing, conventionally known.

At the rear of the base 10 a carriage 26 is slidably mounted upon conventional guides or ways for movement at right angles to the workpiece axis. The carriage 26 is shifted between the work engaging position shown in FIG. 2, and the retracted position which removes the tooling from the workpiece, by a reversible expansible chamber motor 28 of the hydraulic type.

Figure 4:
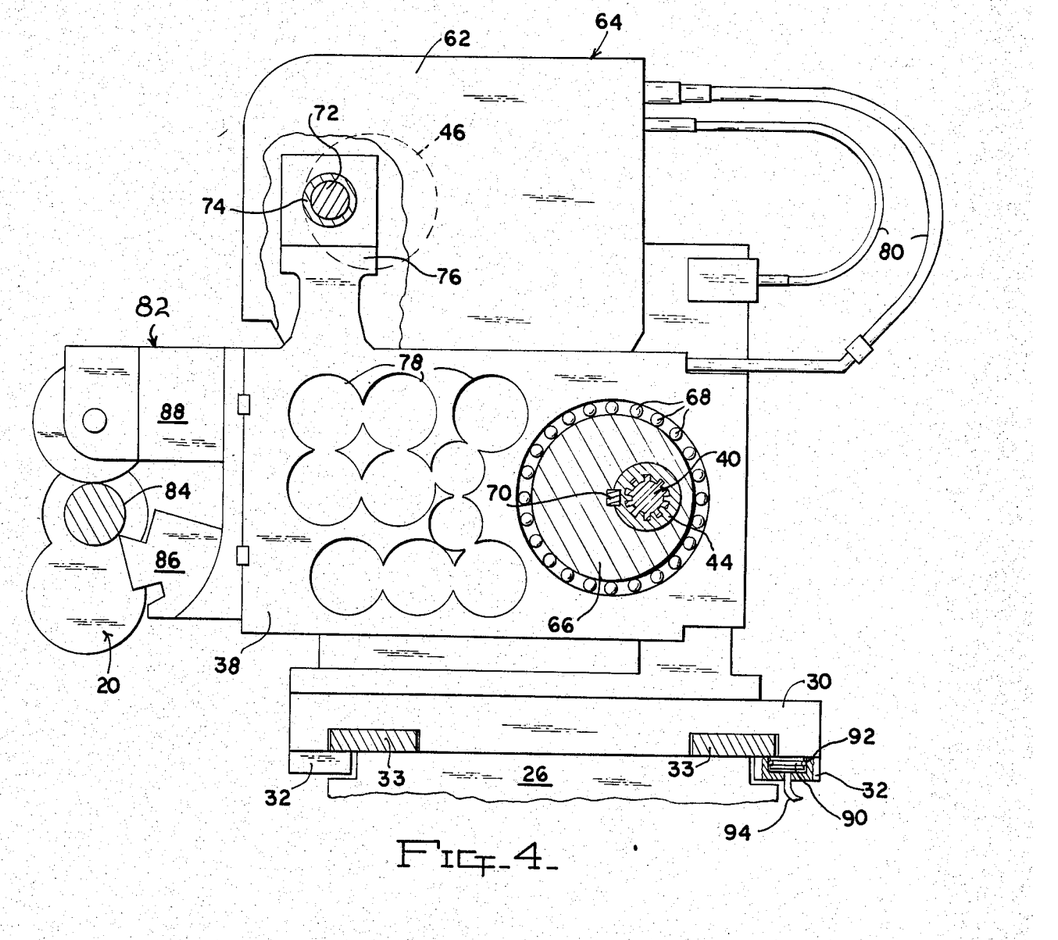
FIG. 4 is an enlarged, elevational, sectional view illustrating the tool cage as taken along Section IV—IV of FIG. 5.

A slide 30 is mounted upon the carriage 26 and includes ways 32 cooperating with ways 33 mounted on the carriage, FIG. 4, perpendicular to the carriage ways, and parallel to the workpiece axis, wherein the slide may be moved parallel to the workpiece axis over a distance equal to, and in alignment with, the crankshaft workpiece length. Positioning of the slide 30 upon the carriage 26 is through the electric slide motor 34 which drives the slide lead screw 36 through a ball nut arrangement, not shown. Thus, operation of the reversible electric motor 34 will translate the slide in either direction upon its ways 32.

The drive for the tool arm 38, upon which the tools are mounted, is mounted upon the carriage 26 for movement toward and away from the head and tailstocks, and portions of the drive are also mounted on the slide 30. This drive includes a splined drive shaft 40 which is parallel to the workpiece axis. The outboard end of the shaft 40 is rotatably supported within bearings mounted upon outboard bearing pillow block 48 mounted upon carriage 26.

The shaft 40 extends through gear housing 42 mounted upon slide 30 which houses shaft 46. The shafts 40 and 46 are interconnected by gear 50 mounted on internally splined sleeve 44 and gear 52 mounted on shaft 46, and idler gear 54, wherein the shafts 40 and 46 rotate in a common direction in a synchronous manner. Shaft 40 extends into housing 55 mounted on carriage 26 and supports worm wheel 56 therein meshing with a worm mounted upon shaft 58, and shaft 40 includes an extension 60 upon which a plurality of rotary switch actuators are mounted, as later described.

The tool arm 38 is supported upon the slide 30 between spaced plates 62 which are fixed upon the slide and constitute a tool case 64 whereby movement of the slide will translate the tool case and tool arm parallel to the workpiece axis. The tool arm 38 includes a crank 66 rotatable within the tool arm upon anti-friction bearings 68, and the sleeve 44 and drive shaft 40 eccentrically extend through the crank 66 and the sleeve is in a driving relation thereto by means of the key 70 which causes the crank 66 to rotate upon rotation of the drive shaft 40. The shaft 46 is driven by gear 52 and shaft 46 is supported on case plates 62 and includes an eccentric crank 72 received within bearing 74 formed on the upper tool arm extension 76. Thus, when shaft 40 is rotated both cranks 66 and 72 rotate and orbit the tool arm 38. Preferably, the tool arm 38 is provided with a plurality of openings 78 to reduce the tool arm mass, and oil is provided to the bearings of the tool cage through conduits 80 for lubrication purposes.

The tools which machine the workpiece crankshaft pins 84 are mounted upon the tool arm 38 and are generally indicated at 82. These tools, in the illustrated embodiment, include a turning tool 86, and a steady rest 88 which engages the upper portion of the workpiece crankshaft pin 84, FIG. 4. Such conventional tooling for turning crankshaft pins is well known.

The slide 30 may be hydraulically locked to the carriage 26 by means of hydraulic locking pads 90, FIG. 4, mounted within the slide ways 32, and such pads, only one of which is shown, are reciprocal within a cylinder 92 and communicate with pressurized hydraulic fluid through conduit 94 wherein the pad may be forced against the associated way 33 to lock the slide firmly to the carriage. If desired, similar locking elements may be used to lock the carriage 26 to the base 10 wherein rigid support of the carriage and slide is achieved during machining.

From the aforedescribed description, it will be appreciated that the tool case 64 and tool arm 38 are supported upon the slide 30 and upon rotation of the shaft 40, the tool arm and tool 86 will orbit in a plane perpendicularly disposed to the workpiece axis in such a manner that the steady rest roller 88 will be maintained upon the pin 84 and follow the workpiece crankshaft pin as it rotates about the workpiece crankshaft axis for turning the pin to the desired diameter.

Figure 5:
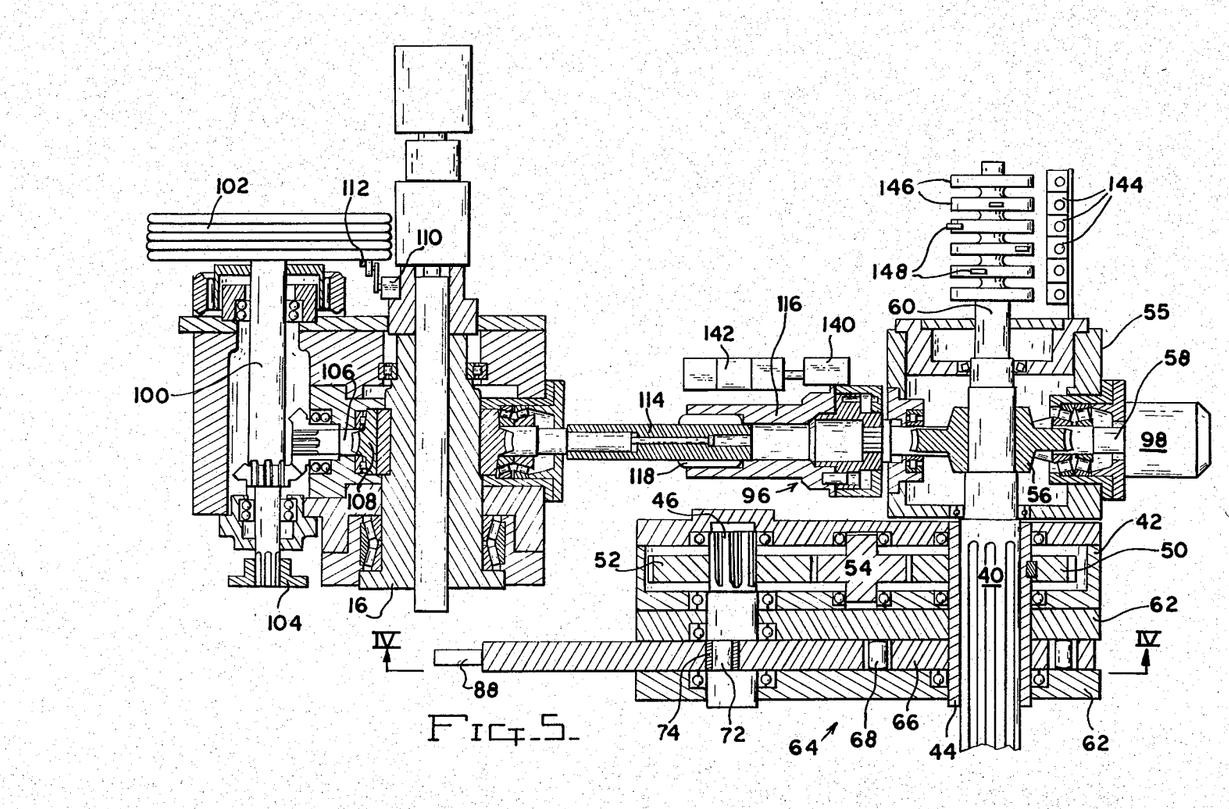
FIG. 5 is a top plan, partial, detail, sectional view of primary components of the spindle and tool drives of the lathe of the invention.
Figure 6:
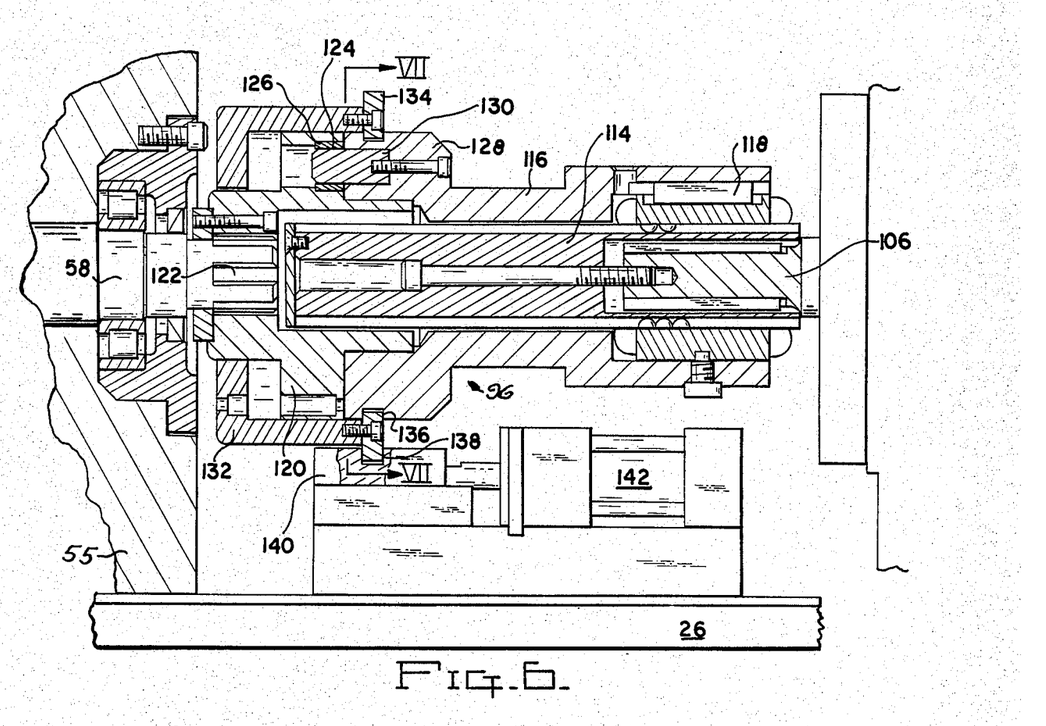
FIG. 6 is an enlarged, detail, diametrical, sectional view of the index connector illustrated in the driving relationship.

The interrelationship between the drive means for the head and tailstock spindles and the drive shaft 40 is best appreciated from FIGS. 5 and 6. As previously mentioned, the drive shaft 40 is driven through a worm drive powered by shaft 58 supported upon anti-friction bearings within housing 55. The shaft 58 at its "front" end supports the female element of the indexable connection generally indicated at 96, and the outer end of the shaft 58 is attached to the hydraulic index motor 98.

The drive motor 22 drives the shaft 100, FIG. 5, through belts mounted upon sheave 102, and the shaft 100 is connected to the tailstock driveshaft 24 by coupling 104. Beveled gearing rotates shaft 106 having a worm which meshes with worm wheel 108 for driving the headstock spindle 16. Orientation of the head and tailstock drive train is accomplished through limit switch 110 and actuator 112 which will stop the stock spindles at the same rotatable position each time the DC motor 22 is stopped.

The shaft 106 is splined and is coaxial with the shaft 58, and serves to support the indexable connection extension 114 for the male element. This portion of the indexable connection includes a sleeve 116 axially movable upon the extension 114 by anti-friction ball key device 118, FIG. 6, wherein the sleeve is readily axially movable upon the extension 114 and is keyed for rotation therewith.

The female component of the indexable connection 96 includes a hub 120 attached to the shaft 58 upon the splines 122. The hub 120 includes a radially extending flange having twelve recesses 124 defined therein, each recess including a sleeve bearing 126, the recesses being evenly circumferentially spaced about the hub at equal radial distances from the hub axis.

Figure 7:
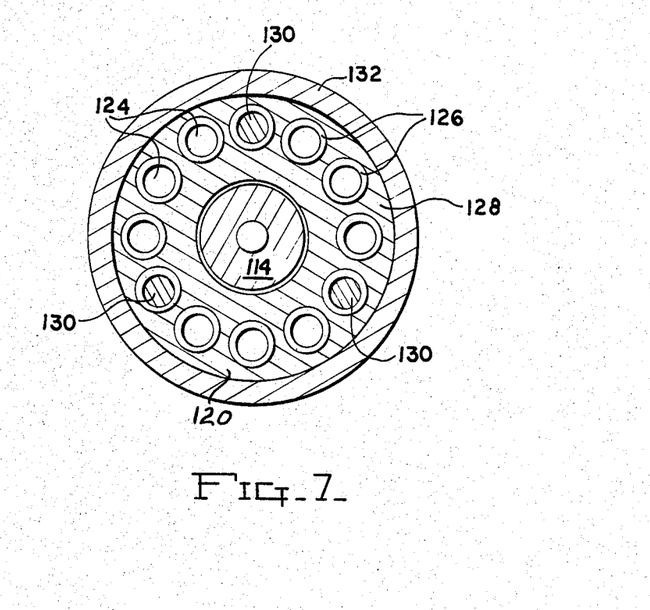
FIG. 7 is a sectional view of the index connector as taken along Section VII—VII of FIG. 6.

The sleeve 116 includes a detent head 128 upon which three axially extending pins 130 are mounted spaced 120° with respect to each other about the axis of the sleeve, and as appreciated from FIG. 7, the spacing between the pins 130 is a multiple of the spacing between the recesses 124 wherein the three detent pins are received within three recesses to establish a positive driving connection between the shafts 58 and 106.

A cup 132 is mounted upon the hub 120 for axial movement thereon, and includes a shifting ring 134 bolted thereto, FIG. 6, having radially extending portions which extend inwardly of the inner diameter of the cup, and outwardly beyond the outer diameter thereof. The detent head 128 includes an annular groove 136 receiving the inwardly extending portion of the ring 134 wherein axial shifting of the cup will shift the sleeve 116 to the right, FIG. 6, sufficiently to remove the detent pins 130 from the recesses 124.

The outer extension of the ring 134 is received within a groove 138 defined in the shifter block 140 mounted upon the carriage 26. The shifter block 140 is translated between its operative positions by hydraulic expansible chamber motor 142 mounted upon the carriage 26. Thus, by operation of the motor 142 the cup 132 may be positioned as shown in FIG. 6 wherein the detent pins 130 engage the recesses 124 within the hub permitting shaft 106 to drive shaft 58, or the motor 142 may shift the cup to the right as viewed in FIG. 6, withdrawing the pins from the recesses permitting relative rotation between the shaft 106 and the shaft 58. Of course, shifting of the cup and detent head from the indexable position wherein pins 130 are withdrawn from the recesses 124 to the driving condition wherein the pins are received within the recesses, must be preceded by an alignment of the detent pins with the recesses.

The magnetic proximity switches 144 each include a wheel or disc 146 mounted on shaft extension 60 upon which a magnetic element 148 is circumferentially mounted and adjusted. A switch 144 is disposed adjacent each wheel 146 whereby the switch will be actuated during each revolution of the adjacent wheel by the magnet mounted thereon. In this manner the angular relationship of each wheel 146 may be very accurately determined thereby providing a plurality of electrical signals indicating the rotational position of the shaft 40.

Figure 8:
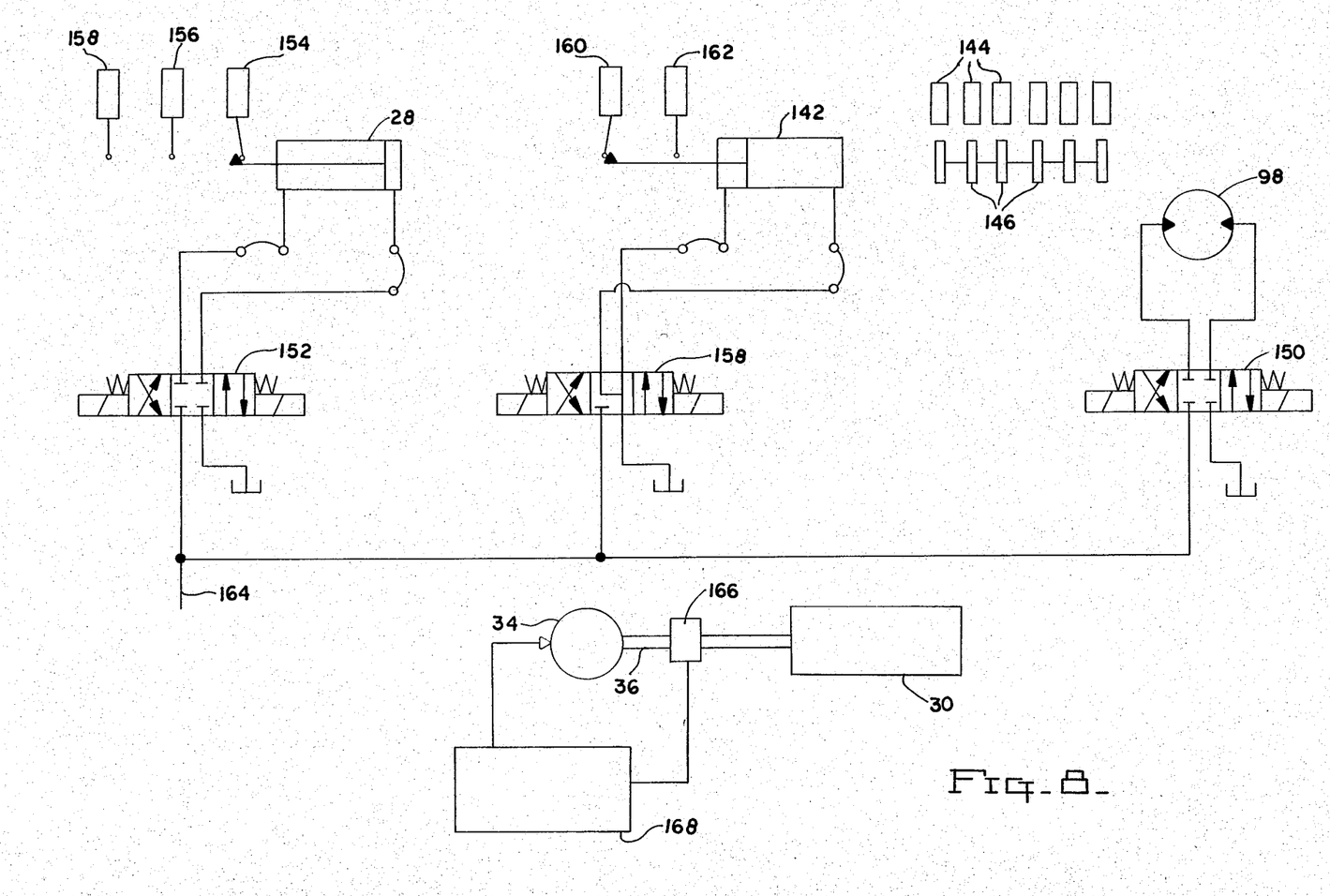
FIG. 8 is a schematic control circuit diagram for the crankshaft lathe of the invention.

With reference to the circuit shown in FIG. 8, the switches 144 are connected by conventional circuits to reversible solenoid operated valve 150 controlling the direction of the rotation of the hydraulic index motor 98. Known acceleration and deceleration devices, not shown, may be utilized with the circuitry controlling the index motor. The carriage expansible chamber motor 28 is controlled by reversible solenoid operated valve 152 wherein the reversible motor 28 may be operated in either direction under pressurized hydraulic fluid, and limit switches 154, 156 and 158 mounted upon the base 10 and schematically represented, control the operation of the valve 152 for movement of the carriage 26 between retracted, feed and full depth positions. The expansible chamber shift motor 142 is operated by a reversible solenoid operated valve 158 producing reversible actuation of the motor 142, and limit switches 160 and 162 mounted upon the carriage 26 sense the position of the cup 132 and the condition of the indexable connection 96. Hydraulic fluid for the aforedescribed motors, and other hydraulic components of the lathe, are provided by pressurized fluid through supply conduit 164 connected to a conventional hydraulic pump system, not shown.

As represented in FIG. 8, the electric DC slide motor 34 drives the lead screw 36 and an encoder 166 senses the rotation of the lead screw. The encoder signals are supplied to a programmable controller schematically represented at 168 which controls the operation of motor 36 and in this manner the position of the slide 30 and the tool case mounted thereon can be accurately regulated.

In operation, from the previous cycle, the drive motor 22 will be off and the shaft 100 will be oriented at its "home" position as determined by actuator 112 and switch 110 which controls the motor 22. The carriage 26 will be retracted wherein the carriage and slide 30 will be withdrawn away from the axis of the head and tailstock spindles, and the slide and tool case 64 will be positioned upon the carriage at its "home" location wherein the tool 82 will be in radial alignment with the first workpiece crankpin 84 to be machined.

Thereupon, the workpiece crankshaft 20 to be machined will be mounted within the headstock and tailstock chucks or holders, either manually or by automatic loading apparatus, not shown, and fixed with the holders. The motor 22 is then energized causing the workpiece 20 and driveshaft 40 to rotate, and as the indexable connection 96 has been indexed to its "home" relationship at the termination of the machining of the prior workpiece, the movement of the tool arm 38 and tool 82 will be in synchronization with the movement of the crankshaft pin 84 to be machined. The valve 152 is energized to move the carriage 26 toward the workpiece axis under rapid traverse bringing the tool case and tool toward the workpiece, the switch 156 produces a feed speed and such movement continues until the workpiece is engaged by the tool 82 and the steady rest 88 and the workpiece pin 84 is machined. After the turning operation is completed as sensed by switch 158, the valve 152 is actuated to energize motor 28 to retract the carriage 26 and remove the tool from the workpiece. During retraction of the carriage, which is under a rapid traverse movement, the motor 22 will stop the shaft 100 at its "home" position producing a predetermined rotational orientation of the stock spindles and the workpiece crankshaft. Thereupon, when the carriage is returned, the motor 142 is actuated to shift the detent head 128 to the right, FIG. 6, withdrawing detent pins 130 from the hub recesses 124. Upon this shifting being completed as sensed by limit switch 162, the index motor 98 then begins to rotate the shaft 58, and the drive shaft 40 until the proper switch 144 indicates that sufficient rotation of the shaft 40 has occurred, and at such time the index motor 98 is deenergized and the shift motor 142 shifts the detent head 128 to the left, FIG. 6, introducing the pins 130 into another set of hub recesses 124. This angular adjustment that has taken place between the shafts 58 and 106 has changed the orientation between the rotative positions of the drive shaft 40 and the workpiece crankshaft which is necessary to permit the next workpiece pin 84 to be machined.

Concurrently during the aforementioned indexing adjustment the slide motor 34 is actuated to shift the slide 30 and tool case 64 to align the tool 82 with the next workpiece pin to be machined. Thus, upon the tool case and tool being aligned with the next workpiece crankpin to be machined, and upon the index adjustment being accomplished, the motor 22 is again energized and the carriage 26 is translated to move the tool 82 into engagement with the crankshaft pin and the tool will orbit with the pin to produce the machining thereof. Upon completion of the machining of the second crankshaft pin the cycle is repeated by retracting of the carriage 26, motor 22 is stopped, the cup 132 and sleeve 116 are shifted, the index motor 98 rotates until the next switch 144 indicates the proper orientation of the shaft 40, the indexable connection 96 shifts to establish a positive interconnection between shafts 58 and 106, and the cycle is repeated to machine the next crankshaft pin.

The aforedescribed cycle will be repeated as often as necessary to machine the crankshaft being supported by the head and tailstocks. Thus, the cycle may be repeated twice, four times, six times or eight times depending upon the number of pins formed on the workpiece. As the sequence of valve and switch operation is automatically controlled by the limit switches and other conventional circuitry, the entire machine operation is automatic once initiated. When machining crankshafts having six or eight pins, the crankshaft design may be such that the same angular relationship between two of the pins relative to the crankshaft axis is the same, and in such event some indexing steps may be omitted if the same angular relationship pins are sequentially turned and it is only necessary to properly position the tool case and slide when machining correspondingly located crankshaft pins.

By using twelve recesses 124 within the index hub 128 most conventional crankshafts can be accommodated. In the event that a five pin crankshaft is to be machined, as is the case with some diesel engines, a different head 128 and hub 120 must be utilized having properly oriented recesses to produce the desired orientation.

Programming of the lathe in accord with the aforedescribed sequence of operation may be accomplished through known microprocessors and machine control apparatus. Only a single crankshaft pin is machined at a time, and yet the indexable connection 96 permits the angular relationship to be changed between the workpiece and tool to accommodate the different rotative locations of the pins relative to the crankshaft axis and the aforedescribed machine is universal in its usage, and this lathe may be used to machine a wide variety of crankshafts requiring only minimal changes in tooling and programming. The aforedescribed lathe is particularly useful in machining short runs of crankshafts such as required with prototype engines and specialty engines of low production.

It will be appreciated that modifications to the inventive concepts may be apparent to those skilled in the art without departing from the spirit and scope of the invention.

We claim:

1. In a universal single spindle crankshaft pin lathe, having a base, headstock and tailstock spindles coaxially rotatably mounted upon the base defining a workpiece rotative axis, workpiece holding means defined upon each spindle, first drive means drivingly connected to said spindles, a drive motor operatively connected to the first drive means, a carriage movably mounted on the base movable toward and away from the workpiece axis at right angles thereto, carriage motor means mounted on the base connected to the carriage selectively positioning the carriage relative to the workpiece axis between workpiece engaging and retracted position, the improvement comprising a slide mounted upon the carriage for movement in a direction substantially parallel to the workpiece axis, a slide motor connected to said slide for selectively positioning said slide upon the carriage, a tool arm mounted upon said slide movable therewith and universally movable in a cutting plane perpendicular to the workpiece axis, eccentric means mounted upon said slide associated with said tool arm for moving said tool arm in orbital motion in said cutting plane, a tool mounted upon said tool arm, second drive means operatively connected to said eccentric means for moving said arm and tool in said cutting plane in an orbital motion, an adjustable indexable connection interconnecting the first drive means and said second drive means whereby the drive motor drives the first and second drive means, means for adjusting said indexable connection whereby the relative angular rotative relationship between the workpiece and said second drive means may be selectively adjusted, and control means controlling the drive motor, carriage motor and said slide motor.

2. In a universal crankshaft lathe as in claim 1, wherein said means for adjusting said indexable connection includes an index motor operatively connected to said second drive means, a shift motor operatively connected to said indexable connection adapted to shift said connection between drive and indexable positions, and control means controlling said index and shift motor actuating said index motor when said indexable connection is in said indexable position.

3. In a universal crankshaft lathe as in claim 1, said index and shift motor control means including a plurality of rotary switches connected to said second drive means sensing the rotative position of said second drive means.

4. In a universal crankshaft lathe as in claim 3, orientation means rotatively orienting the first drive means, said index and shift motor control means being connected to said orientation means permitting automatic cycling of the lathe operation.

5. In a universal single spindle crankshaft pin lathe, having a base, headstock and tailstock spindles coaxially rotatably mounted upon the base defining a workpiece rotative axis, workpiece holding means defined upon each spindle, first drive means drivingly connected to said spindles, a drive motor operatively connected to the first drive means, a carriage movably mounted on the base movable toward and away from the workpiece axis at right angles thereto, carriage motor means mounted on the base connected to the carriage selectively positioning the carriage relative to the workpiece axis between workpiece engaging and retracted positions, the improvement comprising, a slide mounted upon the carriage for movement in a direction substantially parallel to the workpiece axis, a slide motor connected to said slide for selectively positioning said slide upon the carriage, a driveshaft rotatably mounted upon the carriage substantially parallel to the workpiece axis, second drive means drivingly connected to said driveshaft rotating said driveshft, a tool arm, means for mounting said tool arm upon said slide for movement therewith parallel to the workpiece axis and movement perpendicular to the workpiece axis, first and second eccentrics rotatably associated with said tool arm rotatable about parallel spaced axes substantially parallel to the workpiece axis, said driveshaft being operatively connected to said eccentrics whereby rotation of said driveshaft rotates said eccentrics to translate said tool arm in a plane substantially perpendicular to the workpiece axis, a workpiece machining tool mounted upon said tool arm engaging the workpiece at the carriage workpiece engaging position, orientation means rotatably orienting the first drive means, an adjustable indexable connection interconnecting the first drive means and second drive means whereby the drive motor drives the first and second drive means and the relative angular rotative relationship between the workpiece and said second drive means and tool arm eccentrics may be selectively adjusted, and means for adjusting said indexable connection.

6. In a universal crankshaft lathe as in claim 5, said indexable connection having engaged and disengaged positions, said means for adjusting said indexable connection including an index motor connected to said indexable connection relatively rotating said second drive means upon said indexable connection being in said disengaged position, indexable motor control means connected to said indexable connection sensing the relative angular relationship between the first drive means and said second drive means controlling operation of said index motor, and shift means connected to said indexable connection selectively shifting said connection between said engaged and disengaged positions.

7. In a universal crankshaft lathe as in claim 6, said shift means including a shift motor, and shift motor control means connected to said shift motor and said indexable motor control selectively operating said shift motor in conjunction with the operation of said index motor.

8. In a universal crankshaft lathe as in claim 7, said index motor comprising a rotary hydraulic motor and said shift motor comprising an expansible chamber motor.

9. In a universal crankshaft lathe as in claim 7, said indexable motor control means including a plurality of switch actuators rotatably driven by said second drive means and a plurality of switches each associated with a switch actuator whereby the rotary position of said second drive means is electrically sensed.

10. In a universal crankshaft lathe as in claim 1 wherein said indexable connection comprise a female member having a plurality of detent receiving recesses disposed about a second drive means shaft at equal radial locations and a male member having at least one detent mounted upon a first drive means shaft receivable within a recess and means axially shifting said members relative to each other to selectively engage said detent and recesses.

* * * * *